United States Patent Office 2,989,541
Patented June 20, 1961

2,989,541
PHTHALIDES
Donald D. Wheeler and David C. Young, Midland, Mich., assignors to The Dow Chemical Company, Midland, Mich., a corporation of Delaware
No Drawing. Filed Mar. 19, 1959, Ser. No. 800,392
7 Claims. (Cl. 260—343.3)

This invention is concerned with phthalides having the formula

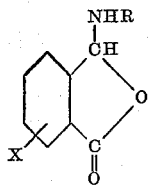

In this and succeeding formulae, R represents a member of the group consisting of lower-alkoxy-lower-alkyl, phenyl-lower-alkyl, cycloalkyl containing from 5 to 6 carbon atoms, inclusive, tertiary-butyl, and alkyl containing from 8 to 18 carbon atoms, inclusive; and X represents a member of the group consisting of chloro and hydrogen. The expressions "lower-alkoxy" and "lower-alkyl" refer to radicals containing from 1 to 4 carbon atoms, inclusive. Representative lower-alkoxy-lower-alkyl radicals include 2-butoxyethyl, 3-methoxypropyl, 3-isopropoxypropyl, 2-(normal-propoxy)ethyl, 4-ethoxybutyl and 1-ethoxy-2-propyl. Representative phenyl-lower-alkyl radicals include 2-phenylethyl, benzyl and 3-phenylpropyl. Representative cycloalkyl radicals include cyclohexyl and cyclopentyl. Representative alkyl radicals include decyl, dodecyl, octyl, hexadecyl and octadecyl.

The new compounds are amber or colorless liquids, or white crystalline solids. They are somewhat soluble in the common organic solvents such as benzene, acetone and ethanol, and substantially insoluble in water. These compounds have antimicrobial activity and are adapted to be employed as toxic constituents in bacteriostatic and fungistatic preparations. These compounds may also be employed in nematocidal and insecticidal compositions.

The above compounds may be prepared by causing a suitable phthalaldehydic acid to react with a primary amine having the formula, $RNH_2$, to produce the desired phthalide and water of reaction. The terms "phthalaldehydic acid" and "3-hydroxyphthalide" refer to a compound having the structure

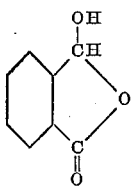

Phthalaldehydic acid is often represented in the literature as having the structure

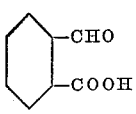

However, the acid employed in this invention and prepared as hereinafter described exists almost entirely in the 3-hydroxyphthalide ring structure, as indicated by its infrared absorption spectrum. Infrared data also indicate the phthalide products to have the ring structure. In the synthesis of the new compounds, the reaction is carried out at a temperature between about 20° and 70° C. It is essential to avoid elevated temperatures since the products are unstable at high temperatures. The reaction is preferably carried out in an inert solvent as reaction medium. Suitable solvents include acetone, benzene, butanone, water and alcohol. Good results are obtained when substantially equimolar proportions of the reactants or an excess of the amines are employed.

In one method of carrying out the reaction, phthalaldehydic acid and the amine are dissolved in or mixed with the reaction solvent. Mixing of the reactants and solvent results in the development of heat of reaction. The resulting mixture is then heated for a period of from a few minutes to four hours during which time the desired phthalide product usually precipitates in the reaction mixture. After completion of the heating period, the reaction mixture is allowed to cool and the phthalide product, if a solid, is separated therefrom by filtration. The product may be purified, if desired, by washing and drying. Recrystallization is not generally employed for purification since many of the compounds are heat sensitive. The product, if a liquid, is recovered from the mixture by heating the latter at reduced pressure to distill off the solvent and water of reaction.

In an alternative method for carrying out the reaction, phthalaldehydic acid and an appropriate amine are mixed in a solvent capable of forming azeotropic mixtures with water such as benzene. The resulting mixture is then heated for a period of from 0.5 to 2 hours at temperatures of from 30° to 50° C. and a pressure of from 15 millimeters to 300 millimeters of mercury to obtain the desired phthalide product and water of reaction. The latter is distilled out of the reaction zone as a solvent-water azeotrope, e.g. benzene-water azeotrope, during the heating process. Remaining organic solvent is also distilled off and the phthalide product recovered as residue.

The following examples illustrate the invention but are not to be construed as limiting.

*Example 1.—3-normal-dodecylaminophthalide*

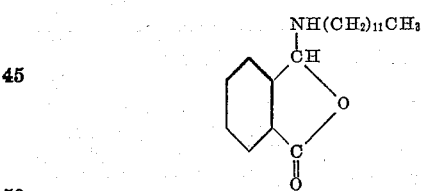

37.0 grams (0.2 mole) of normal-dodecylamine is dissolved in 150 milliliters of benzene and 30.0 grams (0.2 mole) of phthalaldehydic acid added thereto. The resulting mixture is heated to 40°–50° C. and the pressure in the reaction zone gradually reduced so as to distill off a benzene-water azeotrope and the remaining benzene and to obtain as residue a 3-normal-dodecylaminophthalide product having a molecular weight of 317.

*Example 2.—3-benzylaminophthalide*

26.8 grams (0.25 mole) of benzylamine was dissolved in 150 milliliters of benzene and 37.5 grams (0.25 mole) of phthalaldehydic acid added thereto. The mixing took place with the evolution of heat of reaction and with the formation of a 3-benzylaminophthalide product and water of reaction. The resulting solution was then warmed to 40°–50° C. to complete the reaction and the pressure reduced to distill off the benzene and water of reaction as a benzene-water azeotrope and to recover the desired phthalide product as residue. The latter was washed with petroleum ether to obtain a purified compound melting from 86° to 89° C.

Example 3.—3-(3-methoxypropylamino)phthalide 22.2 grams (0.25 mole) of 3-methoxypropylamine, 37.5 grams (0.25 mole) of phthalaldehydic acid and 150 milliliters of benzene were mixed together. The resulting mixture was heated to 40°–50° C. and the pressure in the reaction zone gradually reduced so as to distill off a benzene-water azeotrope and the remaining benzene. This process was carried out over a period of one hour. At the end of this period, the pressure was further reduced to 15 millimeters of mercury to distill off other low boiling materials and to obtain as residue a 3-(3-methoxypropylamino)phthalide product having a refractive index, $n_D^{20°}$ of 1.553.

Example 4.—3-(2-methoxyethylamino)phthalide 35 grams (0.3 mole) of a 72 percent aqueous solution of 2-methoxyethylamine, 45 grams (0.3 mole) of phthalaldehydic acid and 300 milliliters of benzene were mixed together. The resulting mixture was heated to 40°–55° C. and the pressure reduced so as to distill off a benzene-water azeotrope and the remaining benzene. This process was carried out over a period of two hours. At the end of this period, the pressure was further reduced to 15 millimeters of mercury and the temperature increased to 60° C. to distill off other low boiling materials and to obtain as residue a 3-(2-methoxyethylamino)phthalide product having a refractive index, $n_D^{20°}$ of 1.545.

Example 5.—3-cyclohexylaminophthalide 24.7 grams (0.25 mole) of cyclohexylamine, 37.5 grams (0.25 mole) of phthalaldehydic acid and 150 milliliters of benzene were mixed together. A reaction started immediately with evolution of heat and cooling was employed to prevent excessive heating. Thereafter, the mixture was heated to about 50° C. and the pressure in the reaction zone gradually reduced to 15 millimeters of mercury so as to distill off a benzene-water azeotrope and the remaining benzene and to obtain as residue a 3-cyclohexylaminophthalide product melting at 90°–92° C.

Example 6.—3-tertiary-butylaminophthalide 37.5 grams (0.25 mole) of phthalaldehydic acid was added to a solution of 18.2 grams (0.25 mole) of tertiary-butylamine in 150 milliliters of benzene. A reaction started immediately with evolution of heat. The mixture was then heated on the steam bath and the pressure in the reaction zone decreased to distill off water and benzene and to obtain a tan-colored solid residue. The latter was recrystallized from benzene to obtain a 3-tertiary-butylaminophthalide product melting at 134°–136° C.

In similar preparations the following phthalides are prepared:

3-octadecylaminophthalide having a molecular weight of 402 by the reaction of phthalaldehydic acid and octadecylamine.

3-(2-isopropoxyethylamino)phthalide having a molecular weight of 235 by the reaction of phthalaldehydic acid with 2-isopropoxyethylamine.

3-(2-phenylethylamino)phthalide having a molecular weight of 238 by the reaction of phthalaldehydic acid and β-phenylethylamine.

3-(benzylamino)-monochlorophthalide having a molecular weight of 274 by the reaction of mono-chlorophthalaldehydic acid and benzylamine.

3-(tertiary-butylamino)-monochlorophthalide having a molecular weight of 240 by the reaction of monochlorophthalaldehydic acid and tertiary-butylamine.

3-(2-phenylethylamino)-monochlorophthalide having a molecular weight of 273 by the reaction of monochlorophthalaldehydic acid and β-phenylethylamine.

The compounds having the structure

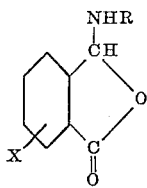

are useful as parasiticides in various insecticidal, nematocidal and antimicrobial compositions for the control of such pest species as *Salmonella typhosa, Staphylococcus aureus, Aspergillus terreus, Rhizopus nigricans,* Meloidogyne spp., *Alternaria solani, Eimeria tenella* and *Musca domestica*.

In representative operations of their use as bactericides, each of the following phthalides: 3-dodecylaminophthalide, 3-(tertiary-butylamino)phthalide, 3-cyclohexylaminophthalide, 3-(2-methoxyethylamino)phthalide, and 3-(3-methoxypropylamino)phthalide were individually dispersed in nutrient agar to prepare a series of agar media saturated with respect to one of the phthalides. Separate portions of each of the agar media were inoculated with *Staphylococcus aureus* and *Salmonella typhosa* organisms. The media were incubated at 30° C. for 3 days. Following the incubation period, it was found that the media containing a phthalide compound completely inhibited the growth of the organisms.

In similar operations, complete inhibition of growth of the fungal species, *Rhizopus nigricans,* was obtained with 3-dodecylaminophthalide.

In representative operations of use as nematocides, good controls of the larvae of the rootknot nematode (Meloidogyne species) were obtained when the larvae were contacted with an aqueous composition containing 10 parts by weight of 3-benzylaminophthalide or 3-dodecylaminophthalide in a million parts of aqueous dispersion.

The phthalaldehydic acid employed in this invention may be prepared by first photochlorinating o-xylene to obtain α,α,α,α',α'-pentachloro-o-xylene by passing chlorine gas into o-xylene while illuminating with sun lamps. The resulting chlorinated o-xylene is then heated with aqueous constant boiling hydrochloric acid and ferric chloride solution as more fully disclosed in U.S. Patent 2,748,162.

The monochlorophthalaldehydic acid employed in this invention may be prepared by first chlorinating o-xylene in the presence of ferric chloride in the temperature range of from 5° to 15° C. to obtain a mono-ring-chlorinated-o-xylene. The ring-chlorinated product is then photochlorinated to obtain α,α,α,α',α'-pentachloro-mono-ring-chlorinated-o-xylene and the latter hydrolyzed in a manner similar to that described in above for phthalaldehydic acid.

This application is a continuation-in-part of our co-pending application Serial Number 595,848, filed July 5, 1956, now abandoned.

We claim:

1. A phthalide having the formula

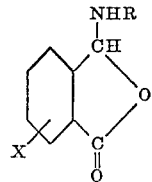

wherein R is selected from the group consisting of lower-alkoxy-lower-alkyl, cycloalkyl containing from 5 to 6 carbon atoms, inclusive, tertiary-butyl and alkyl containing from 8 to 18 carbon atoms, inclusive; and X is selected from the group consisting of hydrogen and chlorine.

2. 3-cyclohexylaminophthalide.

3. 3-tertiary-butylaminophthalide.

4. 3-(2-methoxyethylamino)phthalide.
5. 3-(3-methoxypropylamino)phthalide.
6. 3-benzylaminophthalide.
7. A phthalide having the formula

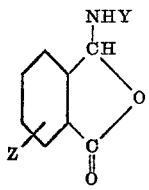

wherein Y represents phenyl-lower-alkyl and Z represents a member of the group consisting of hydrogen and chlorine.

References Cited in the file of this patent

Beilstein's Handbuch der Organischen Chemie, vol. 18, S.2643, page 606 (1934).

Glogauer: Berichte Deut. Chem. Gesell, vol. 29, pages 2036–39 (1896).